(12) United States Patent
Gorelik et al.

(10) Patent No.: US 10,565,160 B1
(45) Date of Patent: Feb. 18, 2020

(54) MANAGING STATE CHANGES OF MODELED OBJECTS IN A THREE DIMENSIONAL VIRTUAL ENVIRONMENT

(71) Applicant: Amazon Technologies, Inc., Seattle, WA (US)

(72) Inventors: Igor Gorelik, Irvine, CA (US); Rosen Ognyanov Baklov, Lake Forest, CA (US); Jesse Aaron Van Beurden, Irvine, CA (US); Pablo Puo Hen Cheng, Pomona, CA (US)

(73) Assignee: Amazon Technologies, Inc., Seattle, WA (US)

( * ) Notice: Subject to any disclaimer, the term of this patent is extended or adjusted under 35 U.S.C. 154(b) by 927 days.

(21) Appl. No.: 14/860,583

(22) Filed: Sep. 21, 2015

(51) Int. Cl.
- *G06F 17/30* (2006.01)
- *G06F 16/11* (2019.01)
- *G06F 11/14* (2006.01)

(52) U.S. Cl.
CPC ........ *G06F 16/113* (2019.01); *G06F 11/1446* (2013.01)

(58) Field of Classification Search
CPC . G06F 11/1446; G06F 17/3007; G06F 16/113
USPC .......................................................... 707/626
See application file for complete search history.

(56) References Cited

U.S. PATENT DOCUMENTS

| | | | |
|---|---|---|---|
| 5,475,834 A * | 12/1995 | Anglin | G06F 11/1469 707/640 |
| 6,005,546 A * | 12/1999 | Keene | G06F 3/14 345/531 |
| 6,493,826 B1 * | 12/2002 | Schofield | G06F 11/1471 707/999.202 |
| 8,756,197 B1 * | 6/2014 | Wilde | G06F 17/00 707/610 |
| 9,244,782 B2 * | 1/2016 | Cain, III | G06F 11/141 |
| 9,633,051 B1 * | 4/2017 | Maccanti | G06F 11/14 |
| 2002/0165724 A1 * | 11/2002 | Blankesteijn | G06Q 30/06 705/1.1 |
| 2003/0037156 A1 * | 2/2003 | Mallart | A63F 13/12 709/231 |
| 2005/0149539 A1 * | 7/2005 | Cameron | G06F 16/86 |
| 2010/0070859 A1 * | 3/2010 | Shuster | G06T 19/20 715/706 |
| 2010/0082538 A1 * | 4/2010 | Rentsch | G06F 17/30457 707/616 |
| 2011/0282836 A1 * | 11/2011 | Erickson | G06F 17/30575 707/622 |
| 2012/0317274 A1 * | 12/2012 | Richter | G06Q 10/06 709/224 |

(Continued)

*Primary Examiner* — Shiow-Jy Fan
(74) *Attorney, Agent, or Firm* — Thorpe North & Western, LLP

(57) ABSTRACT

Technology for managing state changes of modeled objects in a three dimensional (3D) virtual environment is provided. In one example, a method may include calculating changes to modeled objects in a virtual environment. The modeled objects and the modifications may be stored in a server data store. Modeled objects in the server data store for which the modifications have been received may be flagged and queued for replication of the modifications to the modeled objects from the server data store to a non-transactional data store. The modifications may be replicated by copying modeled object state data from the server data store to the non-transactional data store.

19 Claims, 8 Drawing Sheets

(56) References Cited

U.S. PATENT DOCUMENTS

| | | | |
|---|---|---|---|
| 2013/0044106 A1* | 2/2013 | Shuster | G06T 19/20 345/419 |
| 2014/0194211 A1* | 7/2014 | Chimes | A63F 13/497 463/43 |
| 2016/0065498 A1* | 3/2016 | Harper | H04L 47/826 709/223 |
| 2016/0070652 A1* | 3/2016 | Sundararaman | G06F 3/0619 711/154 |
| 2017/0333792 A1* | 11/2017 | Shuster | A63F 13/355 |

* cited by examiner

MANAGING STATE CHANGES OF MODELED OBJECTS IN A THREE DIMENSIONAL VIRTUAL ENVIRONMENT

BACKGROUND

In recent years, the adoption of computing devices such as smartphones, tablets, and game consoles has exposed many people to video games and graphical simulators. This is in part due to the network-connectivity offered by these devices, and the robust application ecosystems that support the download of video games, simulators, and other applications to these devices. As a result, video games have become a popular past-time for many people.

As a result of the interest in video games, the demand for video games has increased along with the demand for ever increasing levels of detail in terms of graphics, physics, sounds, and other features to create a more immersive environment. However, such increases in overall demand also increase the demand on computing devices used to execute the video games. This demand may be even more apparent in the online computing world where hundreds or thousands of players may be using gaming servers to interact with each other in a video game environment. Video game developers are placing increased loads on such centralized servers.

Further, video game and simulation developers and developers of other software applications are increasingly relying on public computing infrastructure, or so-called virtualized computing or "cloud computing", such as may be provided by a service provider, in order to quickly and easily setup and maintain servers and systems for executing the games, simulations, or other software. Computing resources in a service provider environment are commonly used to provide services, storage, and the like, and these computing resources are often scalable to adjust to rising or falling demand. However, video games and similar software applications have been less able to easily transition to scalable solutions that are available from computing service providers.

DETAILED DESCRIPTION

Figure 1:
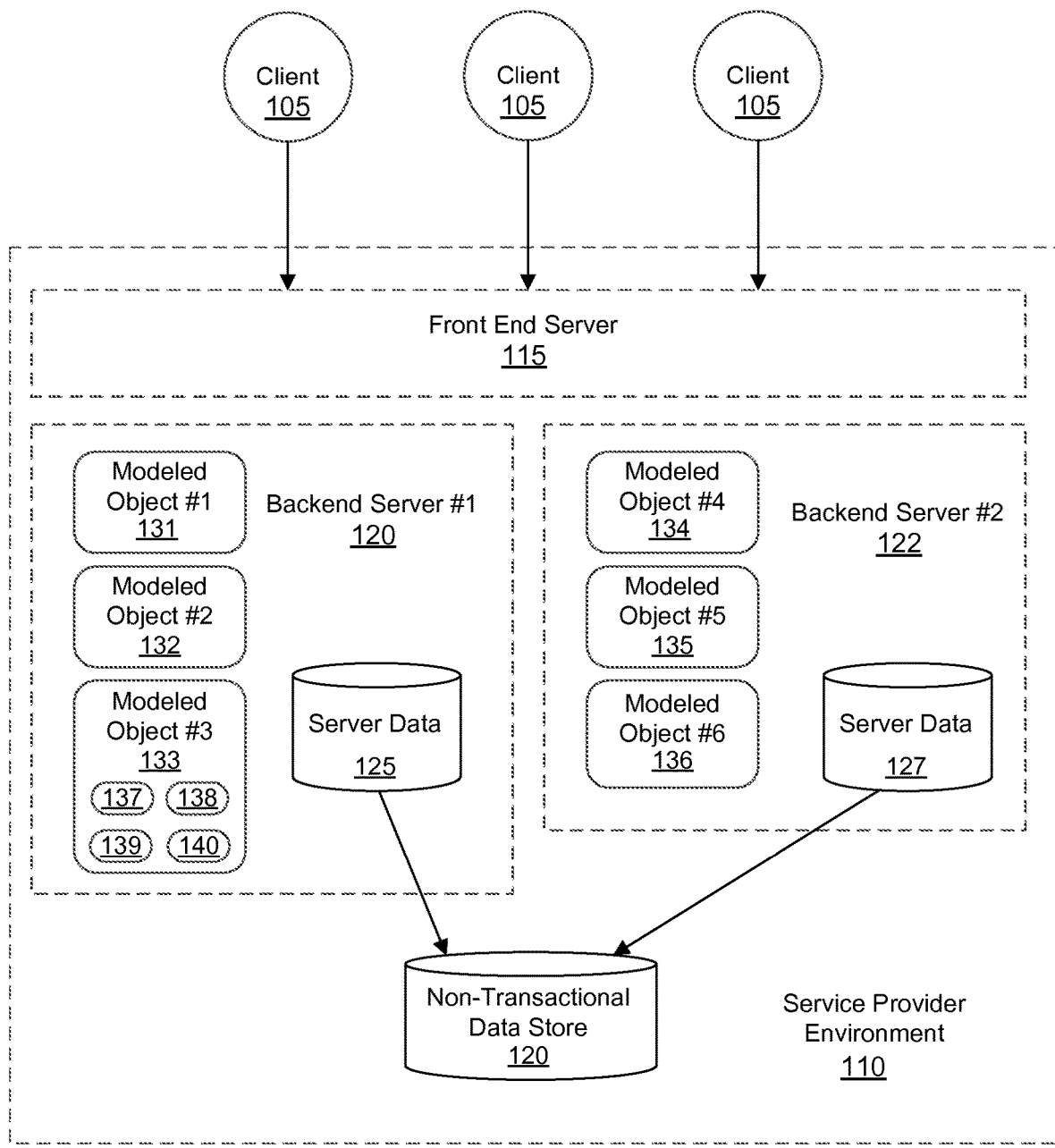
FIG. 1 is a schematic overview of a system for managing state changes of modeled objects in a three dimensional virtual environment in accordance with an example of the present technology.

A technology for managing and replicating (e.g., backing up) state changes of modeled objects in a three dimensional (3D) virtual environment is provided. For example, the virtual environment may be a game environment or a graphical simulation environment. A method according to the present technology may include calculating changes to modeled objects in a virtual environment. The modeled objects and the modifications may be stored in a server data store. Modeled objects in the server data store for which the modifications have been received may be flagged and queued for replication of the modifications to the modeled objects from the server data store to a non-transactional data store (i.e., a backup data store). The modifications may be replicated by copying modeled object state data from the server data store to the non-transactional data store.

Non-transactional data stores may be used because the non-transaction data stores are capable of higher performance writing as compared to transactional data stores. For example, a fast and flexible NoSQL data store may provide low latency backup of objects for the 3D virtual environment and may be provided through a service provider environment at any scale. Updates or modifications to the virtual environment may be made serially to the non-transactional data store between rendering frames as the updates occur, but with a limit defined by the throughput capability of the non-transactional data store. For example, in some instances all of the pending updates that occurred in a given frame (or in a duration less than the time of a frame or between frames) may not be able to be replicated to the non-transactional data store from the server's data stores due to the throughput capability of the non-transactional data store. However, these changes may be queued and may be processed within a few frames of the environment updates. In one example, the present technology may relate to a distributed game world simulation.

In one example, a method according to the present technology may include recovering a virtual environment after an interruption, crash or unexpected termination of a server executing a portion of the virtual environment, or to scale the virtual environment by adding additional servers to execute the virtual environment. States of modeled objects in the virtual environment may be loaded from a local file cached prior to the interruption. A list of modeled objects stored in a common or backup modeled object data store may be downloaded, and the list may include modified modeled object state data backed up to the backup modeled object data store. The method may include matching the initial modeled objects in the environment against the list of modified modeled objects using modeled object identifiers. Initial modeled object states in the environment may be compared against the modified modeled object state data in the list of backed up modeled objects. The initial modeled object states of the modeled objects in the game environment may be modified to match the modified modeled object state data from the list of modeled objects if there is no discrepancy between a number of sub-objects defined by the initial modeled object states and the modified modeled object state data from the backup modeled object data store. If there is a discrepancy, then the initial modeled object states may be used rather than the modified modeled object states. In another example, rather than reverting to the default states, the method may resolve the discrepancies, such as by filling in gaps of missing sub-object state data or by reconciling inconsistent state data resulting from incomplete backup. The present technology may exchange data store consistency for improved performance and conflict resolution may be performed when restoring after a server interruption. In contrast, conventional conflict resolution between objects being backed up to a transactional database is performed during a save process and is intended to improve data store consistency at the expense of performance.

Reference will now be made to FIG. 1. For large game worlds, simulated environments or other virtual environments, such as 3D or modeled virtual environments, the environments may be simulated across multiple servers 120, 122. The ability to store and restore a world or environment state, or more granularly a modified state of objects in that environment, is valuable. Where a user is able to interact with the environment, it is desirable for a server 120, 122 to be able to restore modifications that a user or multiple users made to the world environment via a client 105, when the server 120, 122 is started or restarted as a result of a previous failure, upscaling, etc.

FIG. 1 illustrates an example system for simulating a virtual environment where multiple backend servers 120, 122 may perform the virtual environment simulation and send data to a client 105, which may be a remote computing device used by a user to access and interact with the virtual environment. The client 105 may represent a user, or in the context of a game may represent a player. Any number of clients 105 may access the game at a given time. Simulation of a game world may be use a significant amount of resources and may be distributed across multiple backend servers 120, 122. Simulation of some virtual environments may be complex or large, and distributing the load across multiple nodes or servers 120, 122 may make managing the virtual environment easier. The backend servers 120, 122 may represent a backend portion of the game. The clients 105 may connect to the backend through a front end server 115 that manages the backend operations, client connections, etc.

One or more of the backend servers 120, 122 may go down, be unavailable, or otherwise have operations interrupted from time to time. For example, there may be hardware or software failures, updates, or maintenance that occurs or is performed. When one or more of the servers 120, 122 is unavailable, there is a potential for changes a player makes to the world, such as destruction of buildings, movement of environment objects, etc., to be lost. The present technology reduces or minimizes the potential for loss and/or the amount of changes that are lost due to the server failure or unavailability, and provides a method for restoring changes after the unavailable server is recovered.

In past methods, a virtual environment state is saved or backed-up at certain time intervals (typically every few minutes) into a transactional data store. The virtual environment state is available to be loaded from the transactional data store later. When, for example, a server failure occurs, the server may be restarted. However, the last few minutes of environment simulation or modifications may be lost. The present technology reduces or minimizes losses after server restoration. For example, the present technology provides a method of storing state data and restoring the state data which reduces these losses. The method may utilize a non-transactional, NoSQL (No Structured Query Language, or non-relational) data store 120 for storing backups of the state data and restoring the state data.

A transactional data store is useful for storing data store transactions. A data store transaction may be a set of commands that are logically grouped together as a single unit of work. For example, when modifications are made to a virtual environment using a transactional data store, these modifications may be a series of update statements, which are grouped as one transaction. Transactional data stores are often used due to containment benefits, meaning that if any of the individual updates in the transaction fail, the entire operation may be rolled back. Also all of the commands may occur together so that another transaction does not change the data before the current transaction is done with its changes. Due to these benefits, transactional data stores have been used for storing virtual environment states. However, transactional data stores are a poor selection for real-time or rapid, continuous and up-to-date or up-to-the-moment updates of records. Non-transactional data stores 120 may provide better performance metrics for real-time updates of records. Also, non-transactional data updates are not grouped together into transactions as is the case with transactional data updates. The ability to process individual update statements as opposed to transactions enables the non-transactional data stores to process smaller updates more rapidly than transactional data stores. However, the ability to roll back modifications as done with transactional data stores is not present. Furthermore, included in the present technology involving a method of storing data to a non-transactional data store 120 is a method of restoring data from the non-transactional data store 120 which is able to identify and perform corrections for failures to complete modifications or updates. These features will be described in additional detail later.

In the past, games have used transactional data stores for backing up game data. Data may be written to the transactional data stores in transactions and at defined intervals, such as every three to five minutes. The data to be written to the transactional data store is pre-cached locally. However, virtual environments may be changing constantly every few seconds. While these changes may be cached locally, when a server interruption or crash occurs and the state data is recovered from a transactional data store, a user may be presented with the virtual environment as it existed five minutes ago rather than how it existed when the server was interrupted. Traditional, transactional data stores are too slow for updating the stored virtual environment data as often as the changes occur. For example, a virtual environment may experience thousands, tens of thousands, hundreds of thousands, or millions of changes every frame. Traditional data stores are not configured for writing these numbers of updates as the updates occur. However, non-transactional data stores 120 exist which are capable of higher performance writing which may be used for the present technology. These data stores may be, for example, a fast and flexible NoSQL data store which is capable of providing consistent, single-digit millisecond latency, and may be provided through a service provider environment at any scale. The data store may be a fully managed virtualized data store in a service provider environment (e.g., in a "cloud" configuration). The service provider may provide such data stores with varying throughput capabilities. Updates or modifications to the virtual environment may be made serially to the non-transactional data store 120 as the updates occur, but with a limit defined by the throughput capability of the non-transactional data store 120. For example, in some instances all of the pending updates that occurred in a given frame (or in a duration less than the time of a frame or between frames) may not be able to be replicated to the non-transactional data store from the backend server's data stores 125, 127 due to the throughput capability of the non-transactional data store. However, these changes may be queued, as is described in additional detail later, and may be processed within, for example, one to twenty video frames or three to five seconds (which may optionally be measured in frames, where one second may represent multiple frames, such as tens of frames) of the environment updates. In such an example, when restoring the virtual environment according to the present storage/restoration technology, the virtual environment state may be from one to twenty frames of backup data, or one to five frames, or one to three frames (or even longer example periods of three to five seconds) or less behind the state when the server 120, 122 became unavailable or crashed, rather than three to five minutes behind as would be the case with a conventional, transactional data store and storage/restoration method.

The present technology may relate to a distributed game world simulation. Game worlds are a valuable example of virtual environments for which the present technology is applied, but the present technology may be applied to virtually any other type or application of virtual, simulated or modeled environments managed by one or more computing devices, computing instances or servers 120, 122. In a distributed game, the game environment may be distributed across multiple servers such that each server has objects that it 'owns' or manages independently of other servers which may manage their own objects. These objects may be of any variety suited to the particular application. For example, a game world environment may include any number of objects. The objects may be modeled objects 131-136. The modeled objects 131-136 may be modeled in two or three dimensions. The portion of the environment managed by an individual server 120, 122 may include one or more objects 131-136. In one example, the portion of the environment managed by an individual server 120, 122 may include a portion of a complex object 136 including multiple sub-objects 137-140, or portions of the objects.

Some example objects 131-136 that may be present in a virtual environment may include rooms, gardens, characters, playgrounds, parks, beaches, wasteland, overgrown areas, woodlands, fields, paths, alleys, streets, shopping malls, garage plots, car parks, tables, chairs, cupboards, beds, cutlery, crockery, cooking utensils, foods, buildings, furniture, equipment, people, vehicles, trees, flowers, grasses, fences, domestic animals, farm animals, wild animals, railway tracks and so on. Virtually anything that exists in the real world and many things that do not exist in the real world may exist as an object in the virtual environment.

At least some of the objects 131-136 in the virtual environment may be modifiable in some way. In other words, a state of modeled objects 131-136 may be modified or updated from an initial state to a modified state. At least some of the objects 131-136 in the virtual environment may be compound objects 136. A compound object 136 is an object that may aggregate multiple sub-objects 137-140 or object portions. For example, a building may be an aggregate of multiple pieces (e.g., wall sections, roof, doors, windows, etc.). As an example, a modifiable environment providing a destructible virtual environment may enhance the realism of a war video game where explosions, impacts and the like may be expected to have an impact on the virtual environment, such as to break apart a building, to shatter glass in windows, blow open or break apart doors, bend metal support beams, etc. The initial states of the objects may be described in a file that is a part of a server installation. Thus, even if modified object states are lost, the virtual environment may be re-created using the object's initial state data that is part of the server installation.

As used herein, the term "game" includes, by way of illustrative example and not limitation, one player or multi-player computer games, including driving games, demolition games, sports simulation games such as basketball, baseball, football, hockey, motor-cross, wrestling, car racing, skiing, and virtually any competition between a player and another player or artificial intelligence, a fast twitch type game such as, for example, first-person shooter games, a turn-based game such as chess, card games, checkers, etc. in which players take turns playing the game, a role playing game, a massively multi-player online game (MMOG) in which hundreds or thousands of players simultaneously play the game.

The present technology may also provide an environment that facilitates game play between and among a plurality of players across disparate hardware platforms (i.e., client computing devices, including different types of client computing devices) used by the various players. Each client 105 computing device may communicate with a server having special purpose software to facilitate game play. The server provides various functionality that may enhance and/or supplement the functionality provided on the client computing device, and generally manages and facilitates game play over a network (e.g., the Internet, an intranet (LAN (Local Area Network), WAN (Wide Area Network)), or other network), such as modem-to-modem or direct link. The present technology further provides a system that is able to scale one or more servers facilitating the game play when a load reaches a predetermined threshold to distribute the functionality of the game play across an increased number of servers or across more robust servers.

The present technology may utilize a client/server architecture that involves client computers connecting through a server with other client computers. Such a configuration may facilitate intervention by the server in decision making between players, and provide increased security by managing aspects of game play and by restricting client access to certain data provided on the server. An example of the client/server architecture of the present technology provides a central data center having at least one server provided therein. In addition, the backend servers 120 and 122 may be connected in a variety of architectures, including a mesh network whereby servers are connected to all other servers.

Figure 2:
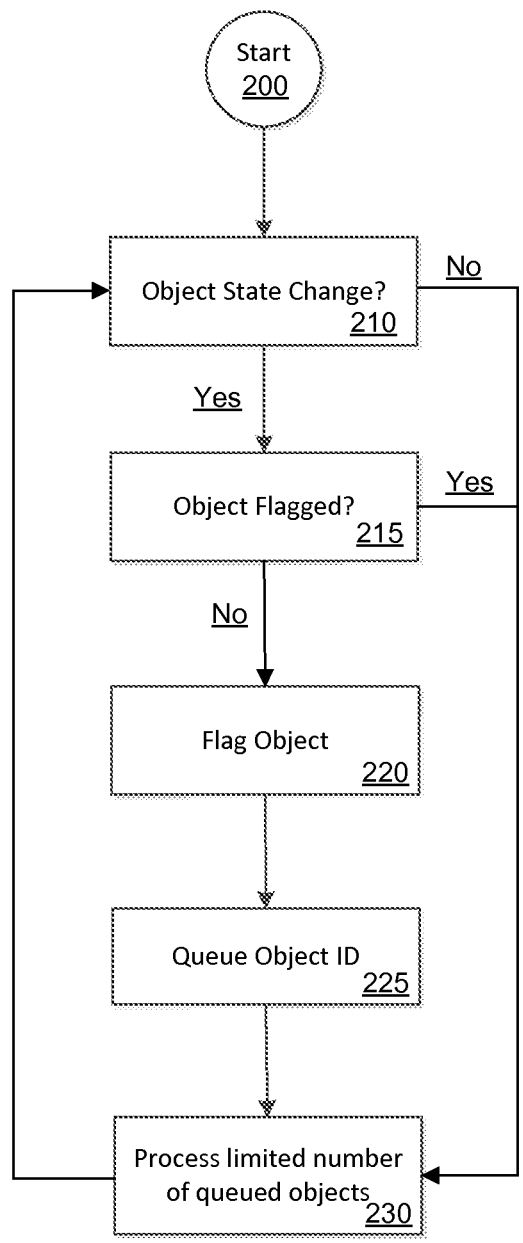
FIG. 2 is a schematic overview of a process for storing state changes of modeled objects in accordance with an example of the present technology.

Referring now to FIG. 2, a storage process is illustrated as a simple decision tree or flow diagram. After a start 200 of the process, or a start of the virtual environment simulation, object state changes may be detected 210. If no changes are detected, then any previously queued objects which have not been replicated to the non-transactional data store may be processed, at least in part. When an object state change occurs ('yes' at 210), the object state data may be stored in a cache or as a hashed data structure in a global unordered map with an object identifier used as a key for the hashed data structure. A determination may be made as to whether the object is already flagged as modified 215. If the object is unflagged, then the object may be flagged 220. In one example, flagging an object may include changing a variable or a value associated with the object to another variable or value, such as changing a '0' to a '1' or vice versa. The first value may represent an unflagged value and the second value may represent a flagged value. Unflagging an object may include changing the second value back to the first value.

Objects flagged as modified may be queued 225 for replication of the modifications to the non-transactional data store. The modified objects may be queued by queuing the object identifiers. Flagging an object and queuing an object may occur substantially simultaneously. A flag may indicate that the object is queued. The queue may be a first-in-first-out queue. If an object state change occurs and the object is already flagged ('Yes' at 215), then the object is not further distinguished by additional flagging and need not be queued because it is already queued. Thus, if an object is flagged, the object identifier need not be checked against the queue. However, the modifications to the object are still written to the server data store and the object state is updated. After the modifications are replicated to the non-transactional data store (e.g., processing a limited number of queued objects 230), the flag may be removed from the object. By queueing the object identifiers rather than the object modifications, when the object identifier reaches the top of the queue and the object state is replicated to the non-transactional data store, the latest object state is what is replicated. At a next update or replication iteration for replicating the modifications (e.g., at each frame; boxes 210-230 represent operations performed at each replication iteration), a limited number of queued objects are serialized and the actual data store update request for replicating the modifications to the non-transactional data store is executed on a thread of a processor at 230. The limited number, as mentioned previously, may be a result of the throughput limitations of the non-transactional data store.

Each time the replication iteration occurs, a replication service may process the queue and execute data store writing commands. With each iteration, a limited number of queued objects may be updated. In one example the throughput of writing may be controlled. For example, if a data store throughput is known, then the writing throughput may be defined as less than or equal to the throughput of the non-transactional data store. At each video frame or other iteration period, as much of the queue may be processed as possible within that time frame. When a server fails and attempts to restore the virtual environment or the portion of the virtual environment managed by the server, the server may download the modified object states (e.g., the modified object states that have been backed up) stored in the non-transactional data store and, using the object identifiers associated with the objects at the server data store and the non-transactional data store, may update the objects at the server according to the restoration method described later. As has been described previously, in addition to use of the present technology in the event of failure, other server interruptions, restarts, addition or removal of servers for scaling, etc. may be example instances for use of the present technology in restoring a virtual environment.

As modifications happen or are made to the virtual environment, these modifications may each be stored to the server data store in a global hash map and queued for replication. The data to be replicated may include the modified object states and may exclude object state data which has not been modified. While the replication iterations have been described by way of example as individual frames, other signals may be used for the replication iterations such as time slices (e.g., a number of milliseconds, such as 10-15 milliseconds).

Figure 3:
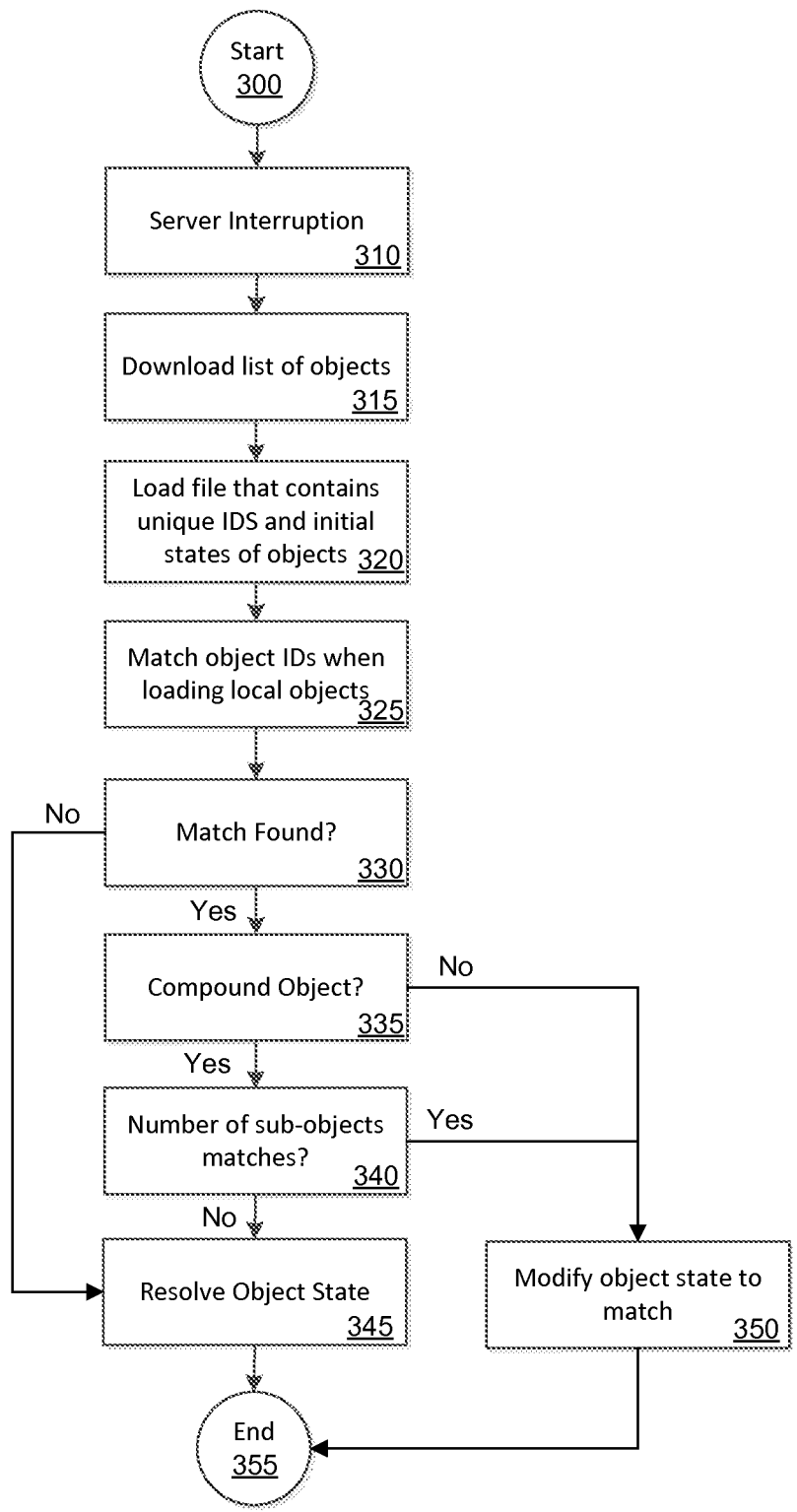
FIG. 3 is a schematic overview of a process for restoring state changes of modeled objects in accordance with an example of the present technology.

Referring now to FIG. 3, a simple diagram of a restoring method for restoring state data of objects after a server interruption is illustrated in accordance with an example of the present technology. The start 300 of the diagram illustrates a time at which a server is executing a portion of a virtual environment. At some time after the server begins executing the virtual environment, the server may experience a server interruption 310. Upon restart, the server may download a list of objects stored in the non-transactional data store at 315. The server may load a local file that contains object initial states and object identifiers at 320, and the object identifiers may be unique. As the server starts loading objects from the local file, the server may attempt to match the identifier of an object against object identifiers in the data downloaded from the transactional data store at 325. If a match is found ('Yes' at 330), then the object has been modified from the initial state and the server may attempt to modify the state of the object from the initial state to the modified state serialized from the non-transactional data store at 350. If the object is a compound object ('Yes' at 335), if the number of chunks (e.g., sub-objects or portions of the object) read from the non-transactional data store does not equal the number of sub-objects that compound object initially possessed in the initial state ('No' at 340), the modified object state may be identified as incorrect, incomplete or corrupt and the object state may be resolved 345, such as by reverting or restoring to the initial state, by inserting a random state, etc. Otherwise, the object state may be modified to match that from the non-transactional data store at 350. This may avoid subsequent errors in processing the object which may occur due to the inconsistent number of parts of the compound object from what is expected. When a match is not found ('No' at 330), the object state may be resolved at 345 as has been described. Once each of the object identifiers has been processed, the method may end 355.

By way of example, if there is a house or other building in the virtual environment that is broken into 100 sub-objects, a non-transactional data store does not allow writing of all of these objects at once. Rather, the objects modifications are written one at a time. If the server fails after 50 are written, the remaining 50 are not written. As a result, when restoring the state data, only 50 sub-objects of the building would be restored, which could lead to errors or inconsistencies in the virtual environment. This issue is specific to non-transactional data stores because in a transactional data store the updates to all 100 sub-objects would be written at once as a single transaction and either the entire transaction succeeds or the entire transaction fails. Due to the characteristics of the non-transactional data store, the restoration process of comparing the initial compound object states against the modified compound object states is useful in avoiding errors.

Continuing with the above example of a building, the local file on the server includes building states which describe the buildings and the number of pieces or sub-objects that each building can be broken into, as well as any transformations of those sub-objects. If the number of sub-objects in the initial building state does not match the number of sub-objects in the modified building state, the modifications may be discarded and the building may be restored to an initial unbroken state. While this may not represent a similar object state to when the server interruption occurred, such reversions may not be frequent and may be localized to, for example, the individual building rather than an entire virtual environment or at least an entire portion of the virtual environment managed by the server. Additionally, such a result is preferable to an inconsistent or error-prone state when only a portion of the changes to the compound object where replicated to the non-transactional data store.

Using the present technology, the amount of simulation time lost on server failure may significantly minimized, and the non-transactional data store write throughput is more manageable to control and pace. At the same time, game objects that change often will overwrite their state in the global unordered map so that a number of write requests to the non-transactional data store which are actually executed will be lower than the actual number of environment or object changes which occurred locally at the server.

The present technology may be useful in very large scale games or other virtual environments, such as may support thousands of users. An individual game may have one session that continues for weeks, months or years—indefinitely until the game is discontinued. Existing multiplayer games perform physics operations at the client and the backend servers may be used to ensure players are not cheating, that player movements and other actions are physically correct, etc. Also, existing multiplayer games do not scale and as the number of players increases, lag is introduced and the game becomes less responsive. The present technology enables physics and other aspects of game play to be maintained at servers remote from the client and this technology is able to scale virtually to any degree to permit virtually any number of players in one game environment without introducing lag. In placing the physics simulation on remote servers, replication of environment modifications to a backup data store (i.e., the non-transactional data store) as the modifications are made is useful in maintaining the game and game environment as has been described.

Each server or other computing node may write to a same or common table in the non-transactional data store. Alternatively, each server may write to a different table in the non-transactional data store. Whether writing to a same or different table, each server may write to a same, common non-transactional data store. In one example, the virtual environment may be very large and accommodate any number of players. For various reasons, however, the present technology may also support multiple instances of a single virtual environment.

In addition to enabling restoration of state data after a server failure or the like, the present technology also enables scaling of the virtual environment. For example, additional servers may be added to expand the virtual environment. As another example, additional servers may be added to process additional load from an increase in a number of players. By distributing the load, a portion of a virtual environment that was previously managed by an individual server may be divided and managed by multiple servers. The newly added servers may use the object state restoration method to provide the latest object state data despite not having been present or involved in the creation of the object state data at the non-transactional data store.

As may be understood, a variety of servers or computing instance types may exist. The following Table 1 illustrates some example computing instance types categorized by "family", where a computing instance family represents a performance characteristic specific to each of the computing instance types in that family. The computing instance types may vary, for example, in compute units, architecture, memory, storage, I/O (Input/Output) performance, and so forth. In scaling the computing instances, the computing instances may be scaled up or down between instance types or in number of instances of a given type.

TABLE 1

| Instance Family | Computing instance Types |
|---|---|
| General purpose | t2.micro\|t2.small\|t2.medium\|m3.medium\|m3.large\|m3.xlarge\|m3.2xlarge |
| Compute optimized | c3.large\|c3.xlarge\|c3.2xlarge\|c3.4xlarge\|c3.8xlarge |
| Memory optimized | r3.large\|r3.xlarge\|r3.2xlarge\|r3.4xlarge\|r3.8xlarge |
| Storage optimized | i2.xlarge\|i2.2xlarge\|i2.4xlarge\|i2.8xlarge\|hs1.8xlarge |
| GPU instances | g2.2xlarge |

Figure 4:
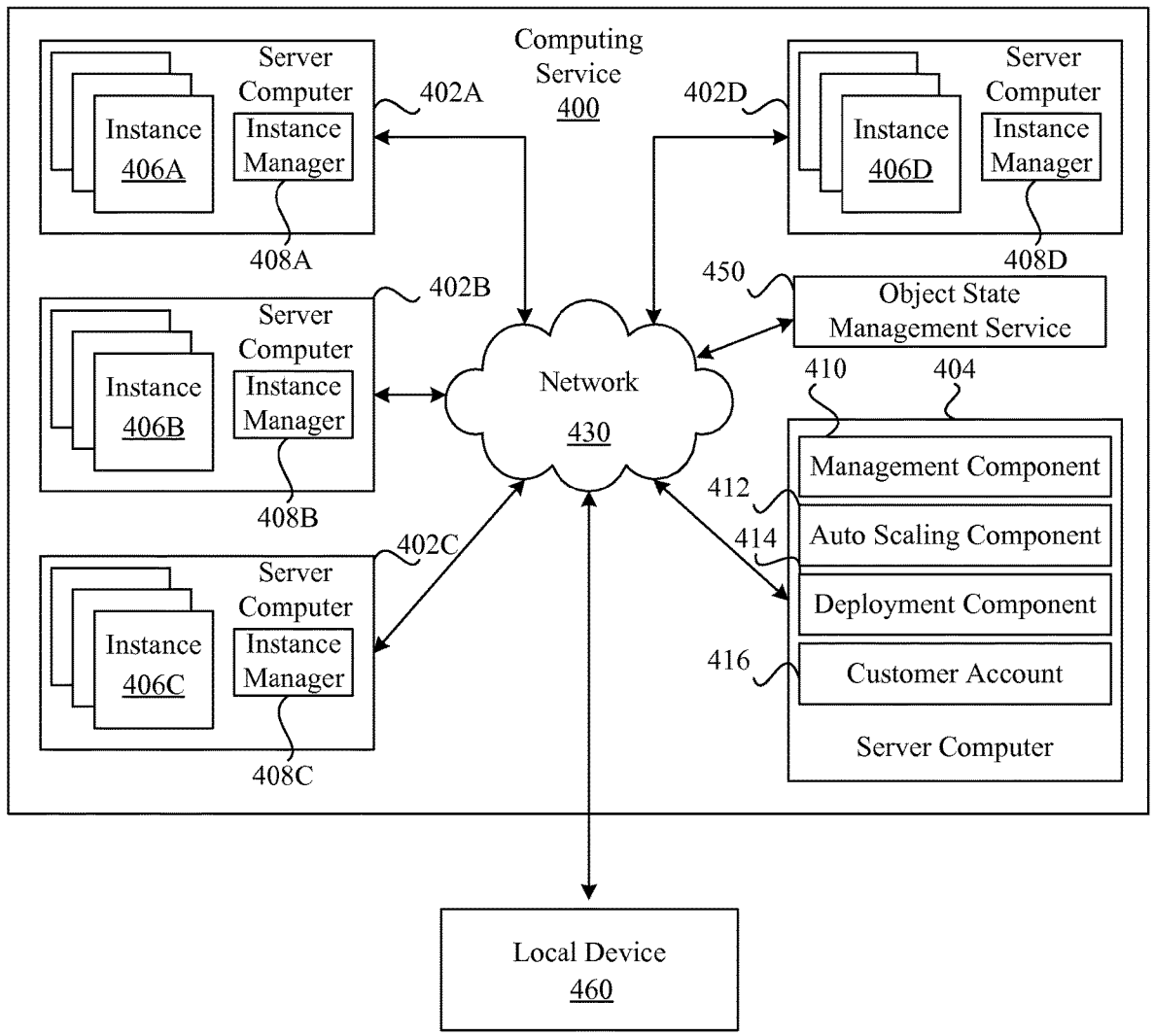
FIG. 4 is a schematic overview of a virtual computing resource service provider in accordance with an example of the present technology.

The modeled object state management technology having the methods of storing and restoring object state data as has been described may be executed or maintained in a data center for a computing service provider. FIG. 4 illustrates how components of a data center may function as a computing service 400 in a service provider environment to provide a platform for computing instances which the present technology may use to execute nodes as described. The computing service 400 (i.e., the cloud provider or service provider) may be capable of delivery of computing and storage capacity as a service to a community of end recipients. In an example implementation, the computing service may be established for an organization by or on behalf of the organization. That is, the computing service 400 may offer a "private cloud environment." In another implementation, the computing service 400 may support a multi-tenant environment, wherein a plurality of customers operate independently (i.e., a public cloud environment). Generally speaking, the computing service 400 can provide the following models: Infrastructure as a Service ("IaaS"), Platform as a Service ("PaaS"), and/or Software as a Service ("SaaS"). Other models may also be provided. In some implementations, end users access the computing service 400 using networked client devices, such as desktop computers, laptops, tablets, smartphones, etc. running web browsers or other lightweight client applications. Those skilled in the art will recognize that the computing service 400 can be described as a "cloud" environment.

The particularly illustrated computing service 400 may include a plurality of server computers 402A-402D. While four server computers are shown, any number may be used, and large centers may include thousands of server computers. The server computers 402A-402D may provide computing resources for executing software instances 406A-406D. In one implementation, the instances 406A-406D may be virtual machines. A virtual machine may be an instance of a software implementation of a machine (i.e. a computer) that executes applications like a physical machine. In the example of virtual machine, each of the servers 402A-402D may be configured to execute an instance manager 408 capable of executing the instances. The instance manager 408 may be a hypervisor or another type of program configured to enable the execution of multiple instances 406 on a single server. Additionally, each of the instances 406 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 404 may be reserved for executing software components for managing the operation of the server computers 402 and the instances 406. For example, the server computer 404 may execute a management component 410. A customer may access the management component 410 to configure various aspects of the operation of the instances 406 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 412 may scale the instances 406 vertically or horizontally based upon rules defined by the customer. In one implementation, the auto scaling component 412 allows a customer to specify scale-up policies for use in determining when new instances should be instantiated, including what type of instance to instantiate, and scale-down policies for use in determining when existing instances should be terminated. The auto scaling component 412 may consist of a number of sub-components executing on different server computers 402 or other computing devices. The auto scaling component 412 may monitor available computing resources over an internal management network and modify resources available based on predictions of need as well as based on actual need.

A deployment component 414 may be used to assist customers in the deployment of new instances 406 of computing resources. The deployment component 414 may have access to account information associated with the instances, such as who is the owner of the account, credit card information, country of the owner, etc. The deployment component 414 may receive a configuration from a customer that includes data describing how new instances 406 should be configured. For example, the configuration may specify one or more applications to be installed in new instances 406, provide scripts and/or other types of code to be executed for configuring new instances 406, provide cache logic specifying how an application cache should be prepared, and other types of information. The deployment component 414 may utilize the customer-provided configuration and cache logic to configure, prime, and launch new instances 406. The configuration, cache logic, and other information may be specified by a customer using the management component 410 or by providing this information directly to the deployment component 414.

Customer account information 416 may include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 400 may be used to host or provide any number of potential services to customers, such as storage, compute, or other services. In one example, an object state management service 450 may be provided for managing object states by storing the object states from data stores at the server computers 402A-402D to a centralized or common, non-transactional data store (not shown) as has been described. The object state management service 450 may be further configured to enable restoration of the object states in the event of failure of the server computers 402A-402D, scaling, server interruptions, and so forth as has been described.

A network 430 may be utilized to interconnect the server computers 402A-402D and the server computer 404. The network 430 may be a local area network (LAN) and may be connected to a Wide Area Network (WAN) 440 so that end users may access the computing service 400. It should be appreciated that the network topology illustrated in FIG. 4 has been simplified and that many more networks and networking devices may be utilized to interconnect the various computing systems disclosed herein.

Figure 5:
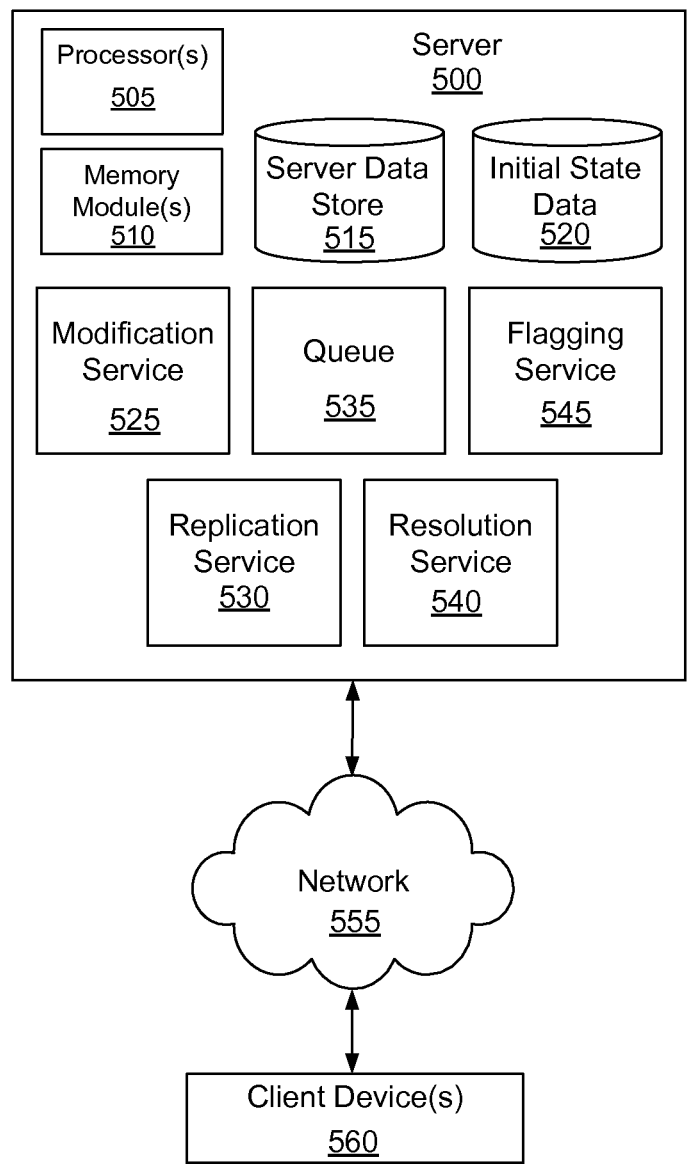
FIG. 5 is a block diagram of a system for managing state changes of modeled objects in a three dimensional virtual environment in accordance with an example of the present technology.

Referring now to FIG. 5, a block diagram of a system in a service provider environment for managing state changes of modeled objects in a three dimensional virtual environment is illustrated in accordance with an example of the present technology. The system elements may be implemented using one or more computing devices in a service provider environment, such as a server 500 as an example computing device, as well as client devices 560 which may be external to the service provider environment, and may be implemented across a network 555. The system may include one or more data stores 515-520 and a number of modules 525-550 as part of an object state management service for storing and restoring object state data.

Computing services offered by a service provider environment, may include a computing device that executes one or more servers or computing instances on the computing device. One or more servers (e.g. a computing instance operating as a server) may be operated to execute an operating system and implement a communications application which is scalable and asynchronous. A user may create, launch, and terminate servers as desired. The user may have some control over the geographical location of servers or clusters of servers to optimize latency and provide high levels of redundancy.

The user or game player at client device 560 may access and interact with a virtual environment at the one or more servers 500 over a network 555 connection, such as a connection through the Internet, for example. The user may perform various operations on the servers such as adding, updating, modifying, deleting or other otherwise interacting with the virtual environment. These operations may be performed by the user from the client device 560. These operations may be performed over a communications network (e.g., network 555). For example, instructions to move an avatar, push an object, shoot a weapon, etc. may be performed over the network 555.

The server(s) 500 may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 4.

The server 500 may be configured to receive and calculate modifications to the modeled objects in the 3D virtual environment using a modification service 525. Each of the modeled objects may be associated with a unique modeled object identifier and a modeled object state. For example, input from users may be received using the modification service 525. This input may involve actions that directly modify the virtual environment, such as placing or removing an object, or directly contacting an object in the virtual environment with an avatar for the user or an object carried by the user. The input may involve actions that less directly modify the virtual environment. For example, a user may launch a rocket-propelled grenade (RPG). The RPG may contact a portion of the environment and cause modifications to the environment. For example, when the RPG contacts a portion of the environment, or at a defined time after launching the RPG, the RPG may have an explosive effect on portions of the environment within a defined radius of the RPG. Buildings for example, which may be compound of complex modeled objects, may be removed from the environment or broken into two or more sub-objects or modeled object portions, with a physics engine for the environment defining what happens to the sub-objects. For example, the modeled object portions may fall toward a virtual ground in the environment, may follow a trajectory outward and away from the RPG, etc. Modifications to the building object which may be replicated may include, for example, the separation of the two or more modeled object portions and the movement of these modeled object portions through virtual space in the virtual environment.

In one example, the server 500 may be one of a plurality of servers. The servers may be computing instances or may be executed on one or more computing instances. The servers or computing instances may each execute or process a different portion of the virtual environment, or otherwise manage the objects in that portion of the environment, such as by updating the environment according to environmental conditions, user input, etc.

The server 500 may provide a server data store 515. The server data store 515 may be configured to store the modeled objects and the modifications for each of the servers. Each time a modification is made to an object, the server data store 515 may record the modifications and store state data for the modeled objects. In other words, when a modification occurs, state data for a modeled object may be saved to record a new or modified state of the modeled object. The data representing the modified state may replace or overwrite the existing state data.

The service provider environment may provide a non-transactional data store (see FIG. 1). The non-transactional data store may be configured to store the modeled objects in a backup state for the servers 500. Each server 500 may manage a queue 535 for replicating the modifications to the modeled objects, or rather than modified states of the modeled objects, to the non-transactional data store. The queue 535 may be a first-in-first-out queue which is processed in a serial manner. The queue 535 may be a queue of modeled object identifiers associated with the modeled objects. When a modification is made to a modeled object, a flagging service 545 may the flag modeled object in the server data store 515 and a modeled object identifier associated with the modeled object may be added to the queue 535. The flagging service 545 may also remove the flag from the modeled objects after the modifications are replicated to the non-transactional data store and the modeled object identifier is flushed from the queue 535. If further modifications to the modeled object occur before the modeled object identifier in the queue is reached, the modifications are stored to the server data store 515, but since the modeled object is already flagged and its identifier queued, no additional flagging or queuing is performed. The queued position of the modeled object identifier may remain the same relative to other queued modeled object identifiers. When the modeled object identifier reaches the top of the queue 535, the object state data for the modeled object is retrieved from the server data store and replicated to the non-transactional data store using a replication service. An object may undergo a number of state modifications from the time the modeled object identifier is queued until the object state is replicated. The object state replicated is the latest object state regardless of the ordering of the queuing since each modification is stored to the server data store and the current state is what is replicated when the modeled object identifier reaches the top of the queue.

Queuing of the modeled object identifiers, as stated above is in preparation for replication of the modifications to the modeled objects from the server data store to the non-transactional data store. The service provider environment may provide a replication service 530 for replicating the modifications. The replication service 530 may perform the replications by copying modeled object state data from the server data store 515 to the non-transactional data store. The replication service 530 may replicate the modifications in a serial order based on the queue 535.

The replication service 530 may also be configured to replicate modeled object state data in a reverse direction. Specifically, the replication service 530 may replicate modeled object state data from the non-transactional data store to the server data store 515 after interruption of operation of the server using the modeled object identifiers. For example, if the server 500 experiences a failure or error and is replaced, restarted or the like, as the server loads the modeled objects for the virtual environment, the replication service 530 may query the non-transactional data store for the latest object states and may replicate and store these object states in the server data store 515. Thus, the restarted server may render the game environment in the modified state even if such modifications were lost locally as a result of the interruption.

The service provider environment may also provide a resolution service 540. The resolution service 540 may be configured to determine whether the modifications to a modeled object were fully replicated to the non-transactional data store when operation of the server is interrupted. For example, the resolution service 540 may determine whether the modifications were fully replicated if a number of modeled object portions, stored at the non-transactional data store is equal to a number of modeled object portions known at the server to be part of the modeled object. The resolution service may be a reversion service and may utilize initial state data 520 to identify the modeled object identifiers, the number of portions of the modeled objects, etc., which initial state data 520 may represent a pre-modified state of a modeled object. If a compound object includes 100 modeled object portions and only 50 of these were replicated to the non-transactional data store, then the resolution service 540 may determine that the modeled object was not fully replicated at the non-transactional data store and that the state data from the non-transactional data store is incorrect or incomplete. As a result, the resolution service 540 may be further configured to revert the modeled object to a pre-modified state based on the initial state data 520 when the modifications were not fully replicated. In other words, rather than using the object state data from the non-transactional data store for representing the object when restarting the server, the object initial state data 120 known at the server 500 may instead by used to represent the object. In other examples, rather than reverting to the initial object state data, the resolution service 540 may resolve missing or inconsistent object state data from the backup non-transactional data store by filling in gaps of missing sub-objects, by reconciling inconsistent object states, by selecting random object states, by using a 'best guess' machine learning approach to complete object state data based on other existing object state data, etc.

Client devices 560 may be available to access and interact with the server 500 in a computing service provider environment or one or more computing instances or clusters, over a network 555. Example client devices 560 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display that may receive and present the message content.

The service provider environment may be implemented across one or more computing device(s) connected via a network 555. For example, a computing device may include a data store and various engines and/or modules such as those described above and such modules may be executable by a processor 505 of the computing device. The system may be implemented as a plurality of computing nodes or computing instances, each of which comprises at least one processor 505 and a memory 510, where the computing nodes are configured to collectively implement the modules, data stores and so forth.

The modules that have been described may be stored on, accessed by, accessed through, or executed by a computing device. The computing device may comprise, for example, one or more processors 505 and one or more memory modules 510. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 5 may be representative of a plurality of client devices 560 that may be coupled to the network 555. The client device(s) 560 may communicate with the computing device over any appropriate network, including an intranet, the Internet, a cellular network, a local area network (LAN), a wide area network (WAN), a wireless data network or a similar network or combination of networks. In one example, the network 555 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 6:
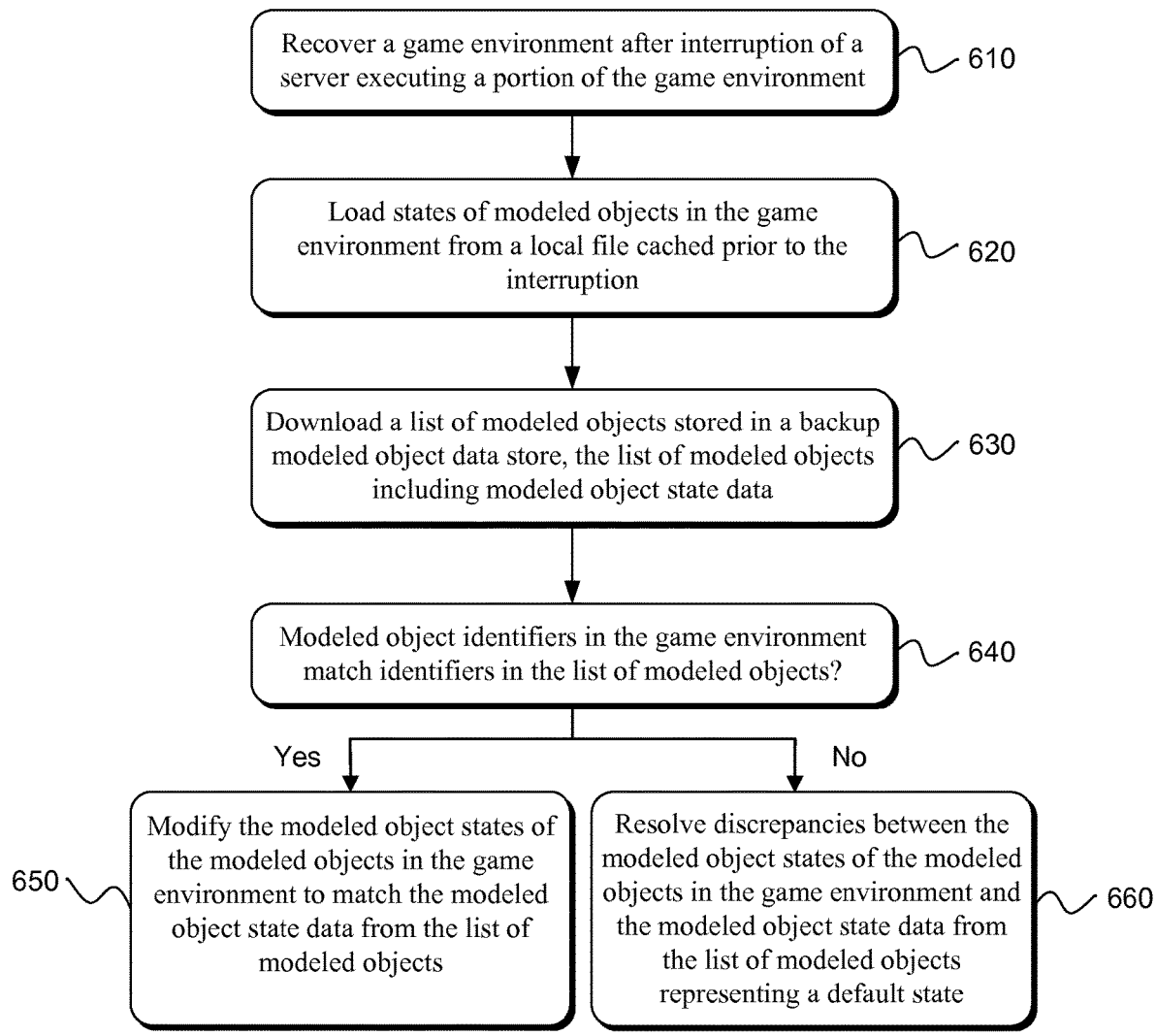
FIGS. 6-7 are flow diagrams for methods of managing state changes of modeled objects in a three dimensional virtual environment in accordance with examples of the present technology.
Figure 7:
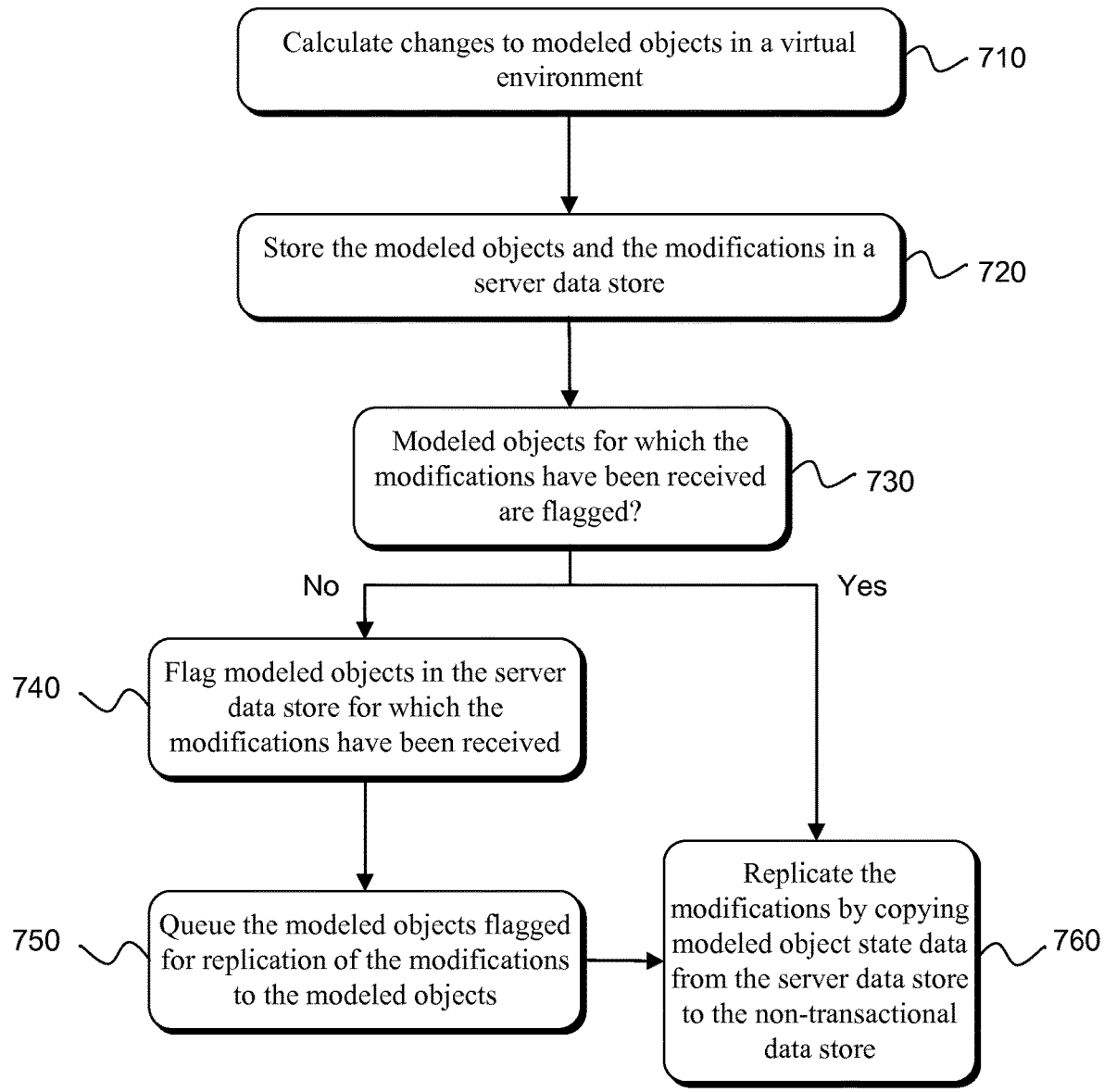

FIGS. 6-7 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 6, a flow diagram of a method is illustrated for managing state changes of modeled objects in a three dimensional (3D) virtual environment. The method may include recovering 610 a virtual environment after interruption of a server executing a portion of the virtual environment. States of modeled objects in the virtual environment may be loaded 620 from a local file cached prior to the interruption. A list of modeled objects stored in a common game modeled object data store may be downloaded 630, which list may include modeled object state data. The method may include matching 640 the modeled objects in the game environment against the list of modeled objects using modeled object identifiers. Modeled object states of the modeled objects in the game environment may be compared against the modeled object state data in the list of modeled objects. In one example, this comparison may include comparing a number of pieces or sub-objects of compound modeled objects in the game environment and the list of modeled objects. The modeled object states of the modeled objects in the game environment may be modified 650 to match the modeled object state data from the list of modeled objects if there is no discrepancy between the modeled object states and the modeled object state data from the common game modeled object data store, such as a discrepancy in number of sub-object states recorded. For example, this may be determined by matching modeled object identifiers of sub-objects in the game environment against the modeled object identifiers of sub-objects in the list. If there are discrepancies, the method may resolve 660 the discrepancies as has been described herein.

The method may also include receiving modifications at a server to modify the modeled objects in the game environment and storing the modeled objects and the modifications at the server. In one example, the modifications may be stored by writing the modifications to a global unordered map using the modeled object identifiers as a key. The modeled objects for which the modifications have been received may be flagged and the modifications may be queued for replication to the common game modeled object data store using the modeled object identifiers. The modifications may be replicated by copying modeled object states from the server to the common game modeled object data store. Also, the flag may be removed from the modeled objects after the modifications are replicated to the common game modeled object data store.

In some examples, this or other methods described herein may be implemented wholly or partially as computer readable program code executed by a processor and the computer readable code may be embodied on a non-transitory computer usable medium.

Referring now to FIG. 7, a flow diagram of a method is illustrated for managing state changes of modeled objects in a three dimensional (3D) virtual environment. The method may include calculating 710 changes to modeled objects in a virtual environment. The modeled objects and the modifications may be stored 720 in a server data store. A determination may be made at 730 whether modeled objects in the server data store for which the modifications have been received are flagged. If not ('no' at 730), the modeled objects may be flagged 740 and queued 750 for replication of the modifications to the modeled objects from the server data store to a non-transactional data store. The modifications may be replicated 760 by copying modeled object state data from the server data store to the non-transactional data store. If the modifications have already been flagged (i.e., 'yes' at 730), the method may continue to replicating 760 the modifications.

In one example, the method may further include replicating each of the queued modifications within five video frames or less from a time of queueing. In a more detailed aspect, the method may include completing replicating each, or at least some, of the queued modifications between single video frame renderings. In the example of a video game, maintaining a frame rate above a defined threshold may be desirable to avoid the players experiencing game lag. Therefore, a number of modifications to be replicated at a time may be limited in order to avoid a negative impact on the frame rate.

The method may include storing the modeled objects for a plurality of servers executing the virtual environment in the non-transactional data store. These servers may be involved in maintaining the virtual environment, which may be a game environment. Each server may manage updates to the environment based on inputs from the users. Each server may be assigned to manage a different portion of the environment. For example, where the environment is a city, each separate server may manage one or more buildings and some portion of land surrounding the buildings. However, any suitable distribution of the environment to be managed among an available number of servers may be employed. In one example, this distribution may relate to a number of sub-objects of objects into which the objects may be broken into, or a level of detail of one object relative to another. The distribution may relate to a number of updates to the environment expected. For example, if a large number of game players are expected to be in certain areas of the environment and far fewer in other areas of the environment, a larger number of updates and more frequent updates to the environment may be expected in the areas of the environment with the greater number of players, and thus these areas of the environment may be managed by a proportionally larger number of servers than the areas of the environment with fewer players or fewer expected players. For games where a number of players fluctuates over time, the servers may be scaled to different sizes or types of servers to accommodate an increase or decrease in a number of users or players accessing the virtual environment.

Each of the servers may write data to a common, non-transactional data store such that game data may be accessed and shared among servers for different aspects of game play. In one example, the modeled objects for each of the plurality of servers may be written to a single table in the non-transactional data store. In another example, the modeled objects for each of the plurality of servers may be written to multiple tables in the non-transactional data store.

In the virtual environment, at least one of the modeled objects may be a compound modeled object having a plurality of modeled object portions, or sub-objects. The modifications to the modeled object may include modifications to at least two of the modeled object portions or sub-objects. The method may further include reverting the compound modeled object to a pre-modified state when the server is interrupted before the modifications to each of the at least two of the modeled object portions are replicated to the non-transactional data store.

In one example, the method may include storing modeled object state changes in a global unordered map with modeled object identifiers as a key. Queuing modeled objects may include queuing the modeled object identifiers flagged in a first-in-first-out queue with a serialized limit for replicating the modifications queued per virtual environment update iteration (e.g., every frame, every 3 frames, every 5 frames, etc.).

Queuing the modeled object identifiers may result in replication of latest modifications to a modeled object when multiple modifications are made to the modeled object before the replication occurs. Specifically, the method may include foregoing additional queuing of modeled object identifiers that are currently flagged. In other words, a modeled object identifier that is already present in the queue is not added to the queue again if another change is made to the queued modeled object before the pending changes are replicated. Because it is the object identifiers which are queued rather than the changes, the latest object state data may be read from the server queue to be replicated to the non-transactional data store when the object identifier is reached in the queue. After the modifications have been replicated to the non-transactional data store, the method may include removing the flag from queued modeled object identifiers in the server data store.

Figure 8:
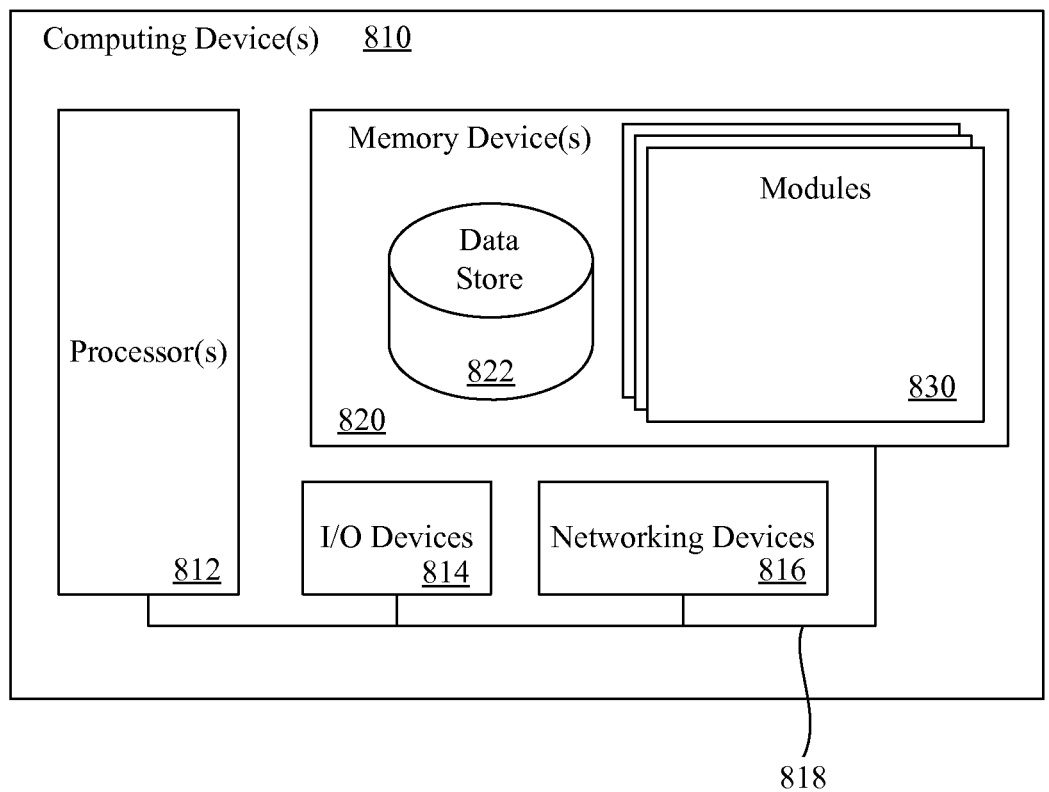
FIG. 8 is a block diagram of a computing system for use in managing state changes of modeled objects in a three dimensional virtual environment in accordance with an example of the present technology.

FIG. 8 illustrates a computing device 810 on which services or modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 830 that are executable by the processor(s) and data for the modules. A data store 822 may also be located in the memory device 820 for storing data related to the modules and other applications along with an operating system that is executable by the processor(s) 812.

The computing device 810 may further include or be in communication with a client device, which may include a display device. The client device may be available for an administrator to use in interfacing with the computing device 810, such as to review operation of a virtual computing instance, make improvements to machine learning models and so forth.

Various applications may be stored in the memory device 820 and may be executable by the processor(s) 812. Components or modules discussed in this description that may be implemented in the form of software using high programming level languages that are compiled, interpreted or executed using a hybrid of the methods.

The computing device 810 may also have access to I/O (input/output) devices 814 that are usable by the computing devices. An example of an I/O device 814 is a display screen that is available to display output from the computing devices. Other known I/O device may be used with the computing device as desired. Networking devices 816 and similar communication devices may be included in the computing device 810. The networking devices 816 may be wired or wireless networking devices 816 that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor 812. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing system that is configured to manage state changes in a three dimensional (3D) virtual environment, comprising:
    a plurality of servers configured to execute the 3D virtual environment as a distributed 3D virtual environment, wherein each server of the plurality of servers is configured to execute a portion of the 3D virtual environment including modeled objects associated with the portion of the 3D virtual environment, the plurality of servers being configured to receive and calculate modifications to the modeled objects, and the modeled objects are modeled in three dimensions;
    a server data store configured to store the modeled objects and the modifications;
    a non-transactional data store configured to store the modeled objects in a backup state for the plurality of servers;
    a queue to queue modeled object identifiers in preparation for replication of the modifications to the modeled objects from the server data store to the non-transactional data store;
    a flagging service to flag modeled objects in the server data store for which the modifications have been received, and to remove the flag from the modeled objects after the modifications are replicated to the non-transactional data store; and
    a replication service for replicating the modifications by copying modeled object state data from the server data store to the non-transactional data store as non-transactional data updates.

2. The computing instance of claim 1, further comprising a resolution service configured to determine whether the modifications to a modeled object were fully replicated to the non-transactional data store when operation of the server is interrupted, the resolution service being further configured to resolve state data of the modeled object if the modifications were not fully replicated.

3. The computing instance of claim 1, wherein the plurality of servers are computing instances each executing a different portion of the 3D virtual environment.

4. The computing instance of claim 1, wherein each of the modeled objects is associated with a modeled object identifier and a modeled object state.

5. The computing instance of claim 1, wherein the replication service replicates the modifications in a serial order based on the queue, the replication service being further configured to replicate modeled object state data from the non-transactional data store to the server data store after interruption of operation of the server using the modeled object identifiers.

6. A computer-implemented method, comprising:
- executing a virtual environment distributed across servers, wherein the virtual environment is a world environment including modeled objects modeled in two or three dimensions;
- calculating modifications to the modeled objects in the virtual environment;
- storing the modeled objects and the modifications in a server data store on the servers;
- flagging modeled objects in the server data store for which the modifications have been received;
- queuing the modeled objects flagged for replication of the modifications to the modeled objects from the server data store to a non-transactional data store; and
- replicating the modifications by copying modeled object state data from the server data store to the non-transactional data store as non-transactional data updates.

7. The method of claim 6, further comprising replicating each of the queued modifications within from one to twenty video frames from a time of queueing.

8. The method of claim 7, further comprising completing replicating each of the queued modifications between single video frame renderings.

9. The method of claim 6, further comprising writing the modeled objects for each of the servers to a single table in the non-transactional data store.

10. The method of claim 6, further comprising writing the modeled objects for each of the servers to multiple tables in the non-transactional data store.

11. The method of claim 6, further comprising scaling at least one of the servers to a different size or type of server to accommodate an increase or decrease in a number of users accessing the virtual environment.

12. The method of claim 6, wherein at least one of the modeled objects is a compound modeled object having a plurality of modeled object portions, and the modifications include modifications to at least two of the modeled object portions, the method further comprising reverting the compound modeled object to a pre-modified state when at least one of the servers is interrupted before the modifications to each of the at least two of the modeled object portions are replicated to the non-transactional data store.

13. The method of claim 6, further comprising storing modeled object state changes in a cache with modeled object identifiers, and wherein queuing comprises queuing the modeled object identifiers flagged for replicating the modifications queued in a predetermined interval.

14. The method of claim 6, wherein queuing the modeled object identifiers results in replication of most recent modifications to a modeled object when multiple modifications are made to the modeled object before the replication occurs, the method further comprising foregoing additional queuing of modeled object identifiers that are currently flagged.

15. The method of claim 14, further comprising removing the flag from queued modeled object identifiers in the server data store when replication of the modifications is complete.

16. A computer-implemented method, comprising:
- executing a virtual environment distributed across servers, wherein the virtual environment is a world environment including modeled objects modeled in two or three dimensions;
- calculating modifications to the modeled objects in the virtual environment;
- storing the modeled objects and the modifications in a server data store on the servers;
- flagging modeled objects in the server data store for which the modifications have been received;
- queuing the modeled objects flagged for replication of the modifications to the modeled objects from the server data store to a non-transactional data store;
- replicating the modifications within one to twenty video frames from a time of queueing by copying modeled object state data from the server data store to the non-transactional data store as non-transactional data updates; and
- scaling at least one of the servers to a different size or type of server to accommodate an increase or decrease in a number of users accessing the virtual environment.

17. The method of claim 16, wherein at least one of the modeled objects is a compound modeled object representing a real world object, and the modifications include modifications to at least two of the modeled object portions as part of a destruction of the virtual environment.

18. The method of claim 16, further comprising determining whether the modifications to a modeled object were fully replicated to the non-transactional data store when operation of one of the servers is interrupted, the resolution service being further configured to resolve state data of the modeled object if the modifications were not fully replicated by selecting random object states.

19. The method of claim 16, further comprising determining whether the modifications to a modeled object were fully replicated to the non-transactional data store when operation of one of the servers is interrupted, the resolution service being further configured to resolve state data of the modeled object if the modifications were not fully replicated by using machine learning to complete object state data based on other object state data.

* * * * *